United States Patent
Kobayashi et al.

(10) Patent No.: US 7,276,670 B2
(45) Date of Patent: Oct. 2, 2007

(54) IMAGE FORMING APPARATUS

(75) Inventors: Toshimitsu Kobayashi, Iwatsuki (JP); Ko Takeuchi, Yokohama (JP); Shinya Kogoh, Yokohama (JP); Toshihiko Matsuo, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 676 days.

(21) Appl. No.: 10/755,359

(22) Filed: Jan. 13, 2004

(65) Prior Publication Data

US 2004/0223171 A1 Nov. 11, 2004

(30) Foreign Application Priority Data

May 9, 2003 (JP) ............... 2003-131990

(51) Int. Cl.
*H01H 9/00* (2006.01)
(52) U.S. Cl. ...................... 200/5 R; 200/5 A
(58) Field of Classification Search ............ 200/5 A, 200/5 R, 512–520, 296, 341–345; 341/22; 345/156–184; 400/472–496
See application file for complete search history.

(56) References Cited

U.S. PATENT DOCUMENTS

| 4,742,198 | A | * | 5/1988 | Martin et al. ............... 200/296 |
| 5,574,623 | A | * | 11/1996 | Girard ......................... 361/627 |
| 5,938,163 | A | * | 8/1999 | Gotham et al. ............. 248/371 |
| 6,550,910 | B2 | * | 4/2003 | Hwang ........................ 347/108 |
| 6,751,312 | B1 | * | 6/2004 | Kudoh ........................ 379/368 |
| 6,781,821 | B2 | * | 8/2004 | Tsubai ........................ 361/681 |
| 6,819,891 | B2 | * | 11/2004 | Suzuki ........................ 399/81 |
| 6,873,806 | B2 | * | 3/2005 | Kobayashi et al. .......... 399/80 |
| 6,934,502 | B2 | * | 8/2005 | Okuda ........................ 399/379 |
| 7,015,408 | B2 | * | 3/2006 | Hirahata et al. ............. 200/310 |
| 7,027,172 | B1 | * | 4/2006 | Parulski et al. ............. 358/1.15 |

FOREIGN PATENT DOCUMENTS

| JP | 11-119496 | 4/1999 |
| JP | 2002-307778 | 10/2002 |

* cited by examiner

*Primary Examiner*—Michael A Friedhofer
(74) *Attorney, Agent, or Firm*—Morgan, Lewis & Bockius LLP

(57) ABSTRACT

An image forming apparatus includes an image forming unit that forms an image on a sheet, a sheet output part that outputs the sheet having the image formed thereon by the image forming unit, and an operation panel for controlling the image forming unit disposed in a vicinity of the sheet output part. The operation panel has an operation part for setting an operation mode and a display part that displays the operation mode. At least a part of the operation part is disposed inside a sheet output area of the sheet output part, and the display part is disposed outside the sheet output area.

8 Claims, 11 Drawing Sheets

FIG. 7A

| | | | | |
|---|---|---|---|---|
| L | 262 | | | |
| x | 990 | 1020 | 1115 | 1205 |
| y | 1013 | | | |
| z | 1178 | | | |
| α | 40 | | | |
| A≤ | 58 | 59 | 62 | 65 |
| A≥ | 45 | 52 | 71 | 86 |

FIG. 7B

| | | | | |
|---|---|---|---|---|
| L | 262 | | | |
| x | 990 | 1020 | 1115 | 1205 |
| y | 1013 | | | |
| z | 1178 | | | |
| α | 60 | | | |
| A≤ | 78 | 79 | 82 | 85 |
| A≥ | 25 | 32 | 51 | 66 |

IMAGE FORMING APPARATUS

BACKGROUND OF THE INVENTION

1. Field of the Invention

The present invention relates to an image forming apparatus for forming an image on a sheet.

2. Description of the Related Art

In order to miniaturize an overall size of an image forming apparatus, JP-A-11-119496 discloses, as shown in FIG. 12, that an operation panel 102 is disposed in a sheet output area on an upper surface of an image forming apparatus 100, and operation buttons 104 on the operation panel 102 and a display part 106 displaying an operation mode set with the operation buttons 104 are covered with a transparent protective member 108 to prevent a tip end of a sheet from being caught thereby, so as to prevent stacking failure.

However, the display part 106 on the operation panel 102 is hidden by the sheet thus output since the operation panel 102 is disposed within the sheet output area, and therefore, the operation mode cannot be confirmed. Furthermore, because the operation buttons 104 should be pressed over the protective member 108, the operation buttons 104 cannot be operated with a mouthstick, which is operated through bite by a physically handicapped person.

JP-A-2002-307778 discloses, as shown in FIG. 13, that an operation panel 110 is disposed on a corner part of an upper surface of an image forming apparatus 112, which is outside a sheet output area. However, the area for disposing the operation panel is too small to provide a display part although a job key 114 and a reset button 116 can be disposed thereon.

SUMMARY OF THE INVENTION

In view of the aforementioned circumstances, the invention is to provide such an image forming apparatus that ensures visibility of display part to improve operability by a physically handicapped person even in the case where the apparatus is miniaturized.

The image forming apparatus according to the invention contains an image forming unit that forms an image on a sheet, a sheet output part that outputs the sheet having the image formed thereon, and an operation panel for controlling the image forming unit, disposed in a vicinity of the sheet output part. The operation panel contains an operation part for setting an operation mode and a display part that displays the operation mode. At least a part of the operation part is disposed inside a sheet output area of the sheet output part, and the display part is disposed outside the sheet output area.

Owing to the display part disposed outside the sheet output area, the display part is not covered with a sheet thus output, and thus the visibility of the display part can be ensured.

Furthermore, since at least a part of the operation part is disposed inside the sheet output area, the area of the operation part can be enlarged. In other words, the area of the operation part can be enlarged to space among operation buttons on the operation part in spite of the miniaturized image forming apparatus.

According to the constitution, operation mistakes, such as pressing plural buttons simultaneously, can be avoided even in the case where a physically handicapped person operates the operation part, whereby miniaturization of the image forming apparatus and improvement of the operability of the operation part can be simultaneously realized.

BRIEF DESCRIPTION OF THE DRAWINGS

FIGS. 7A and 7B are tables showing calculation results of a standing angle of a display part of an image forming apparatus according to an embodiment of the invention;

DESCRIPTION OF PREFERRED EMBODIMENTS

An image forming apparatus according to an embodiment of the invention will be described.

Figure 3:
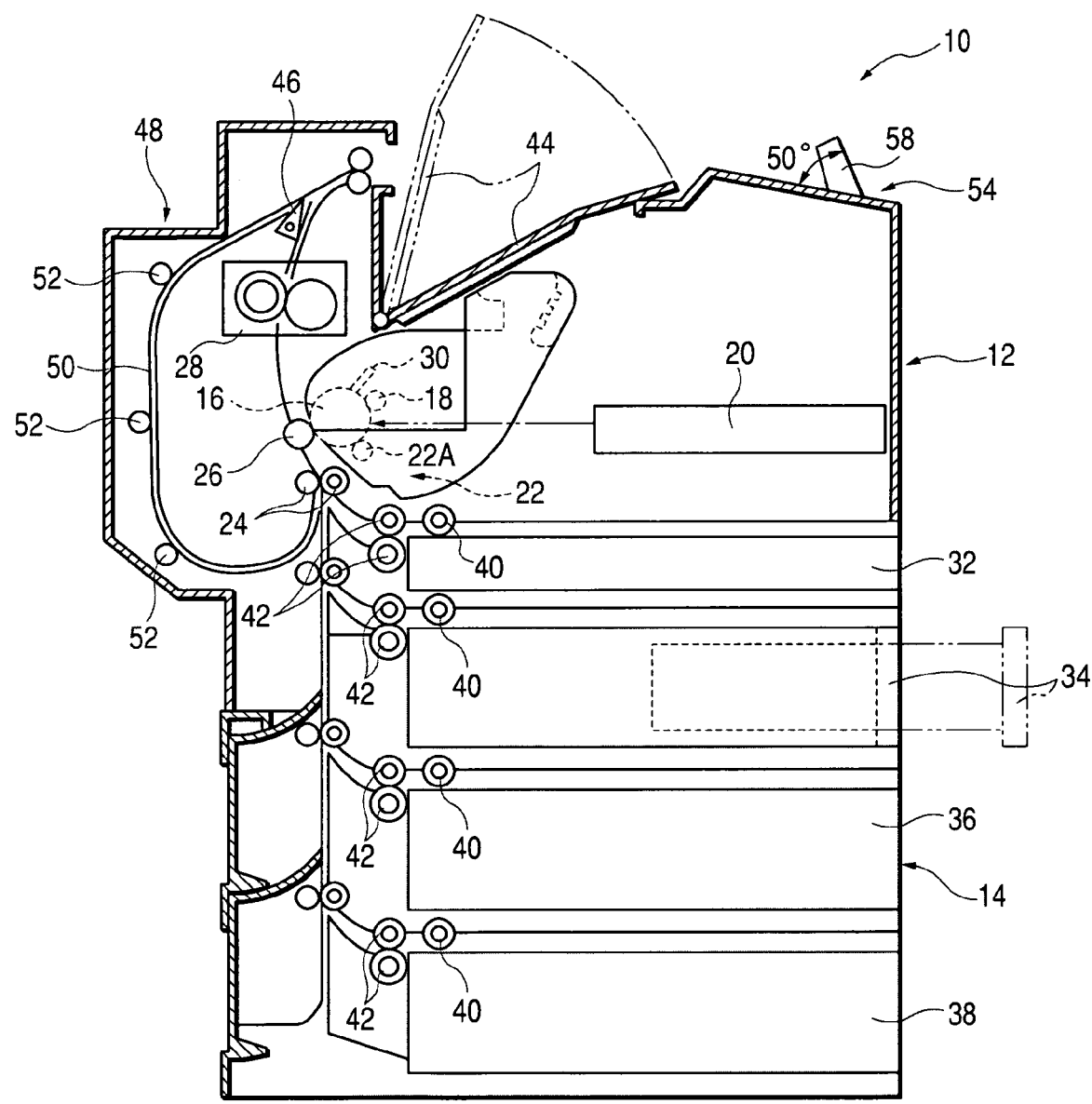
FIG. 3 is an illustrative view showing an image forming apparatus according to an embodiment of the invention.

As shown in FIG. 3, an image forming apparatus 10 is constituted by an image forming apparatus main member 12 and a paper feeding device 14. The image forming apparatus main member 12 is equipped with an image carrying member 16, on a surface of which an electrostatic latent image is formed by imagewise irradiation with light after uniformly charging, a charging device 18 for uniformly charging the surface of the image carrying member 16, an optical box 20 for forming a latent image depending on a difference in electrostatic potential formed by imagewise irradiation with light based on image data on the image carrying member 16, a developing device 22 for visualizing the latent image by selectively transferring a toner on the latent image, a transferring device 26 for transferring a toner image (unfixed image) on the surface of the image carrying member 16 onto a sheet fed with a resist roller 24, a fixing device 28 for fusing the toner image on the sheet by application of heat and pressure, and a cleaning device 30 for cleaning a toner remaining on the image carrying member 16 after transferring the toner image.

The image carrying member 16 has a photoreceptor layer on the surface thereof, and after uniform charging followed by exposure, the electric potential of the exposed area is attenuated. The charging device 18 is a member in the form of a roll in contact with the image carrying member 16. A voltage is applied between the charging device and the image carrying member to cause discharge within minute gaps in the vicinity of the contact part, whereby the surface of the image carrying member 16 is substantially uniformly charged. In addition to the aforementioned configuration, the charging device may have such a mechanism that a high voltage is applied to an electrode wire to charge the image carrying member 16 through corona discharge.

The optical box 20 forms an electrostatic latent image based on image data on the peripheral surface of the image carrying member 16 by scanning the peripheral surface of the image carrying member 16 with a blinking laser. The optical box 20 may be an array of light emitting elements, such as LED, which blink based on image data.

The developing device 22 has a developing roller 22A in a cylindrical form disposed to face closely the image carrying member 16. A developing bias voltage is applied between the developing roller 22A and the image carrying member 16. A developing bias electric field is thus formed between the developing roller 22A and the image carrying member 16, and a toner having an electric charge is transferred to the exposed part on the image carrying member 16 to form a visible image.

The transferring device 26 is a member in a roll form disposed to face the image carrying member 16, and a transferring electric field is formed between the transfer device 26 and the image carrying member 16 to transfer the toner image onto a passing sheet.

After transferring the toner image on the sheet with the transferring device 26, the sheet is separated from the image carrying member 16. The sheet thus separated is conveyed to the fixing device 28, and the transferred image is fixed by applying heat and pressure with the fixing device 28, followed by outputting the sheet to an output tray 44. After completing the transfer, the surface of the image carrying member 16 is cleaned with the cleaning device 30 to prepare for the next image forming process.

The paper feeding device 14 for feeding sheet one by one to the interior of the image forming apparatus main member 12 is provided under the image forming apparatus main member 12. The paper feeding device 14 is equipped with detachable trays 32, 34, 36 and 38, which can be drawn out in the direction opposite to the sheet feeding direction.

The capacity of the tray 32 is 150 sheets, and the capacity of the tray 34 can be selected from a tray for 250 sheets and a tray for 550 sheets. The trays 36 and 38 are optional and each has a capacity of 550 sheets.

Paper feeding rollers 40 for feeding sheet from the trays 32, 34, 36 and 38 are provided in the vicinities of the tip ends of the trays 32, 34, 36 and 38. Raveling members (not shown in the figures) in contact with the paper feeding rollers 40 are provided on the tip end side of the trays 32, 34, 36 and 38, and thereby sheets in the trays 32, 34, 36 and 38 are fed one by one.

The sheet thus dispatched from the paper feeding device 14 is conveyed to the transferring position of the toner image at a prescribed timing with a resist roller 42 disposed in the vicinity of the paper feeding device 14.

In the case of double-side printing, a sheet having an image fixed on one side thereof is not output to the output tray 44 but conveyed to a conveying unit for double-side printing 48 by switching the conveying direction with a switching gate 46. In the conveying unit for double-side printing 48, the sheet is turned over with conveying rollers 52 disposed along a conveying path 50 and then again conveyed to the resist roller 24. An image is then transferred and fixed on the back surface of the sheet, and the sheet is output to the output tray 44.

The substance of the image forming apparatus according to the embodiment of the invention will be described.

Figure 1:
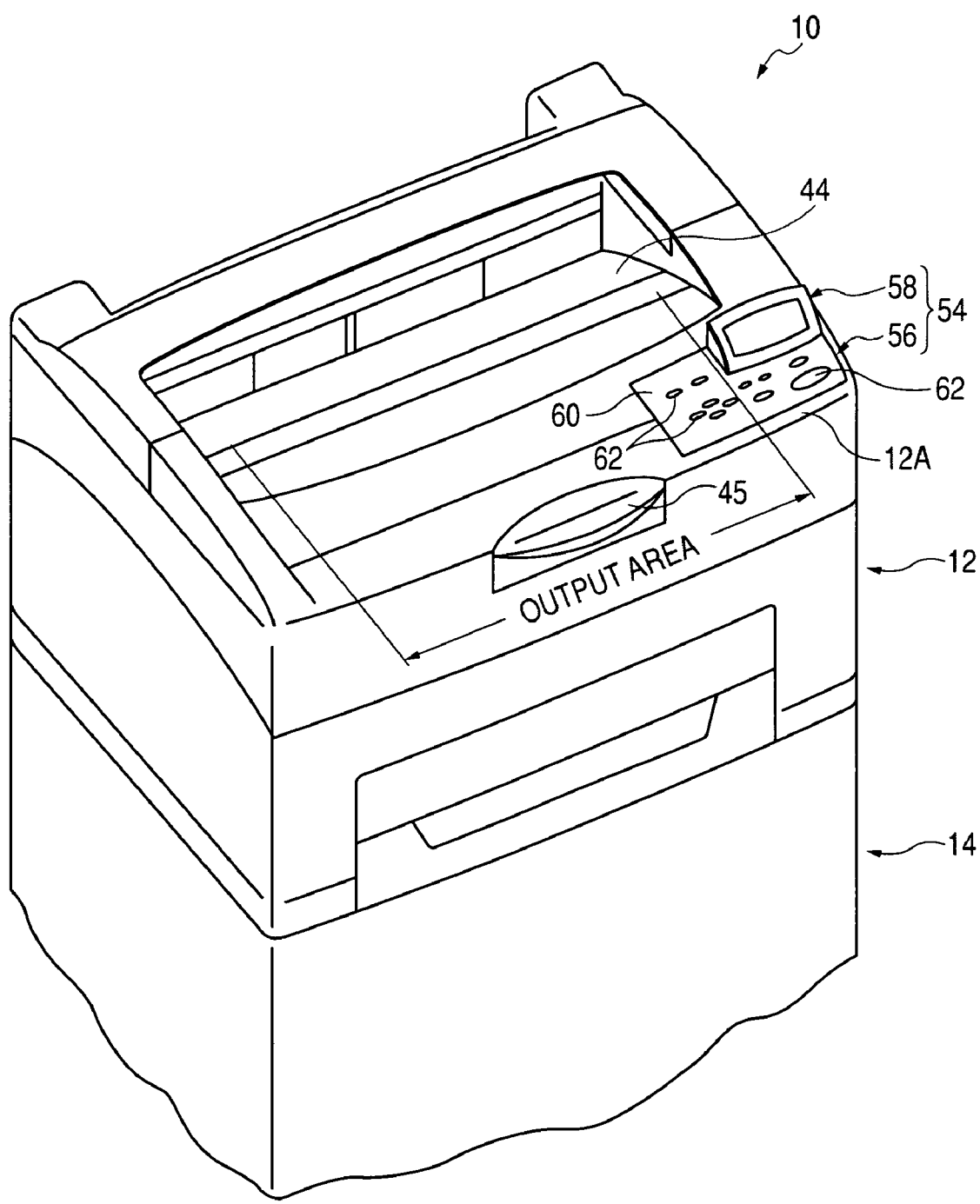
FIG. 1 is a perspective view showing an image forming apparatus according to an embodiment of the invention.
Figure 2:
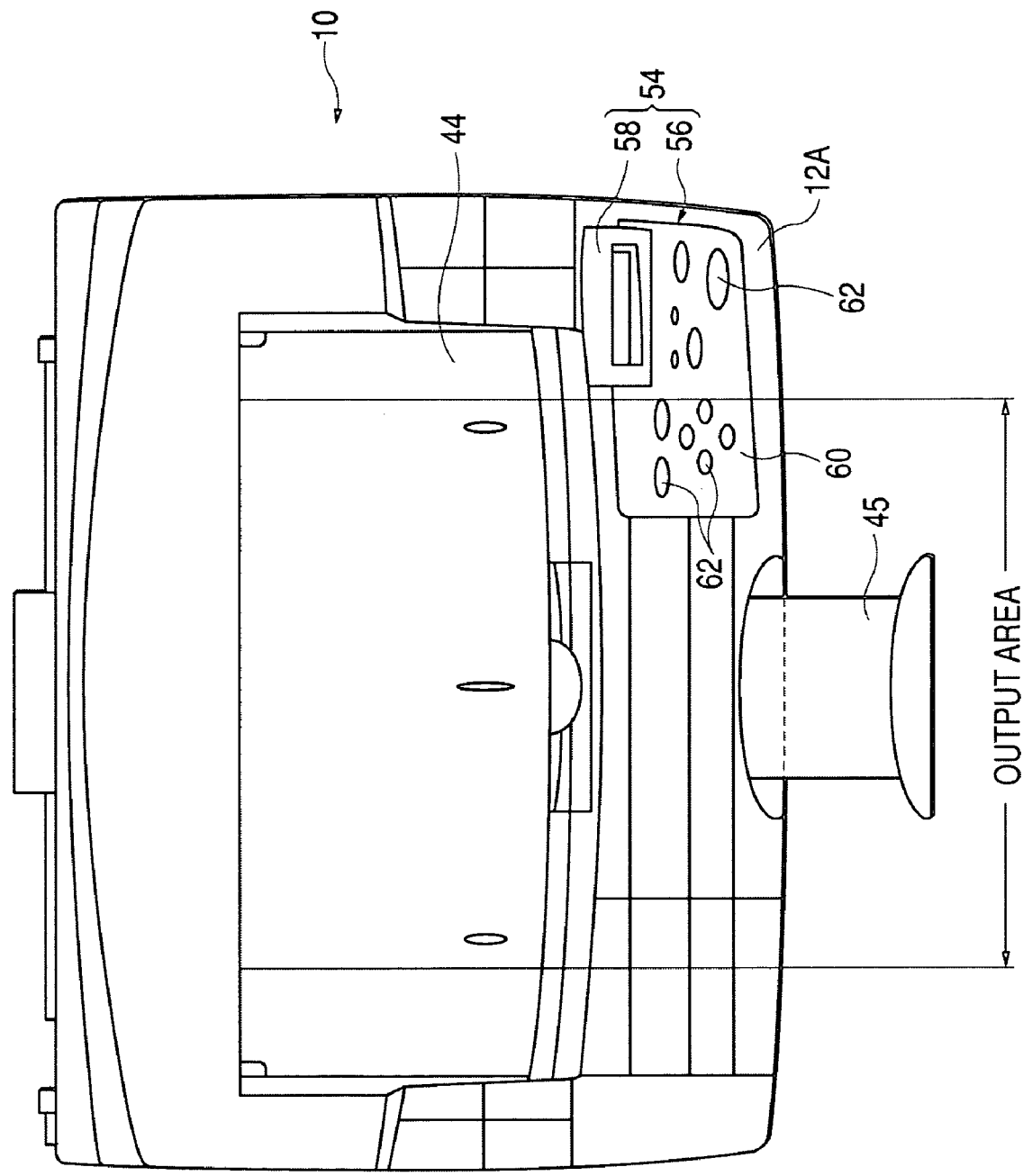
FIG. 2 is a plane view showing an image forming apparatus according to an embodiment of the invention.

As shown in FIGS. 1 to 3, the output tray 44 is provided on the upper surface of the image forming apparatus main member 12, and sheets thus output can be stacked thereon. An extension tray 45 is drawably provided on the front side of the image forming apparatus 10, and in the case where a large sized sheet (a sheet having a large length, such as a A3 size and a legal size) is used, the extension tray 45 is drawn out to prevent the sheet from dropping from the image forming apparatus 10.

In the vicinity of the tip end of the output tray 44, an operation panel 54 is provided at a corner part of the upper surface 12A of the image forming apparatus main member 12. The operation panel 54 is constituted by an operation part 56 for setting an operation mode (such as, a print mode and a power saving mode) of the image forming apparatus 10, and a display part 58 for displaying the operation mode thus set by the operation part 56, and the display part 58 is disposed outside the output area of the sheet thus output.

The output area herein means an area, to which a sheet is output, and more specifically, it means such an area on the output tray 44, the upper surface 12A of the image forming apparatus main member 12 and the extension tray 45 that can carry stacked sheet running over the output tray 44.

Figure 4:
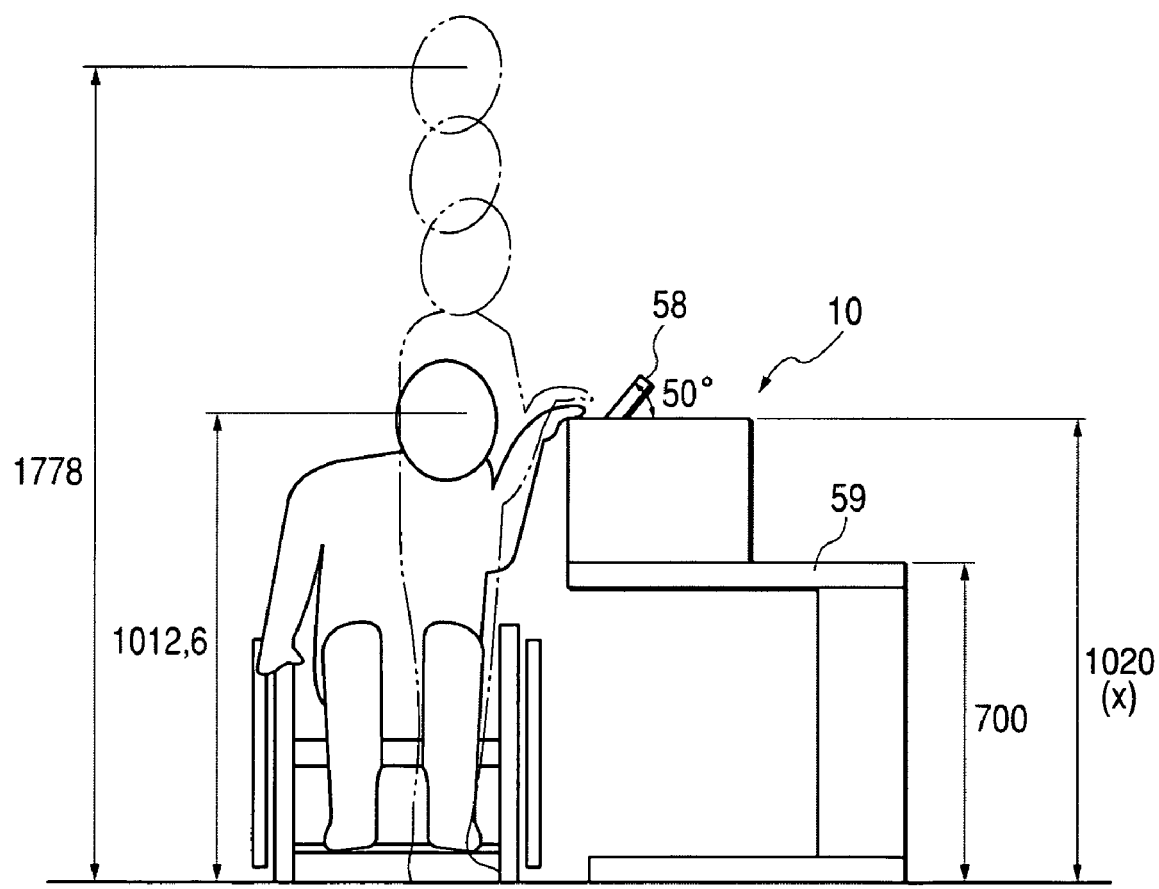
FIG. 4 is an illustrative view showing evaluation of visibility of a display part of an image forming apparatus according to an embodiment of the invention.

The display part 58 is disposed on the upper surface 12A of the image forming apparatus main member 12 in a state standing up by about 50° with respect to the upper surface 12A (described later). The height (x) of the display part varies depending on the size and the number of trays, as shown in FIG. 4. In the case where the tray 34 has a capacity of 250 sheets, the height of the display part of the image forming apparatus is 990 mm (i.e., the sum of the height of the display part 58 within the image forming apparatus (290 mm) and the height of the desk 59 according to Japan Desk Standard (700 mm)), and in the case where the tray 34 has a capacity of 550 sheets, the height of the display part of the image forming apparatus is 1,020 mm (i.e., the sum of the height of the display part 58 within the image forming apparatus (320 mm) and the height of the desk 59 according to Japan Desk Standard (700 mm)).

In the case where the optional tray 36 having a capacity of 550 sheets is installed, the height of the display part of the image forming apparatus is 1,115 mm (i.e., the sum of the height of the display part 58 within the image forming apparatus (415 mm) and the height of the desk 59 according to Japan Desk Standard (700 mm)), and in the case where the tray 38 having a capacity of 550 sheets is further installed in addition to the tray 36, the height of the display part of the image forming apparatus is 1,205 mm (i.e., the sum of the height of the display part 58 within the image forming apparatus (505 mm) and the height of the desk 59 according to Japan Desk Standard (700 mm)).

Figure 5:
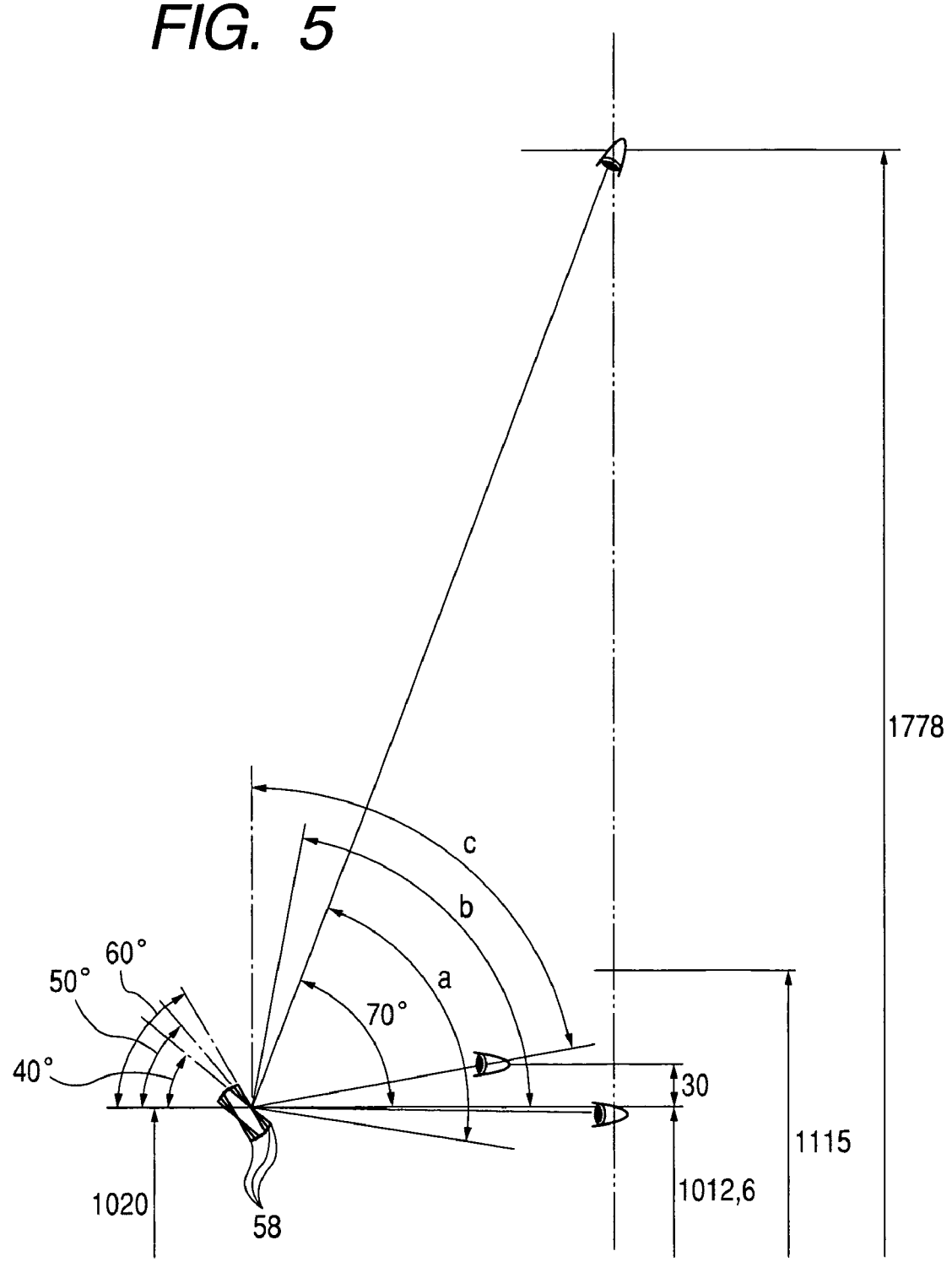
FIG. 5 is an illustrative view showing evaluation of visibility of a display part of an image forming apparatus according to an embodiment of the invention.

As shown in FIGS. 4 and 5, in the case where the standing angle of the display part 58 with respect to the upper surface 12A of the image forming apparatus main member 12 is about 50°, the viewing angle of 80° (an angle between the perpendicular line and the visibility limit α of 40°) is expressed by b. When the visibility of the display part 58 for the standing position is evaluated with an assumption that the height of the display part is 1,020 mm, the visual line angle with respect to the horizon for the height of the visual point for the standing position of 1,778 mm (which is the upper limit of the visual point for the standing position of Japanese males (target age: 20 to 69, target range: 95% of target)) is 70°, and thus the visual line angle falls within the viewing angle 80° (range a) even when the standing angle of the display part 58 is increased to 60°.

The visual point for the seating position on a wheel chair is 1,012.6 mm (which is the lower limit of the visual point for the seating position of Japanese females (target age: 20 to 69, target range: 95% of target), and thus the visual point of a posture of looking into the display part 58 for the seating position on a wheel chair is 1,042.66 mm (which is the sum of 1,012.6 mm and 30 mm). In this case, the display part 58 can be viewed in the case where the standing angle of the display part 58 is 40° (range c), but in the case where the height of the display part 58 within the image forming apparatus main member 12 exceeds 1,115 mm, the visual point is outside the viewing angle to fail to view the display part 58.

In this embodiment, the standing angle A of the display part 58 with respect to the upper surface 12A of the image forming apparatus main member 12 is about 50°. The standing angle A will be described below.

Figure 6:
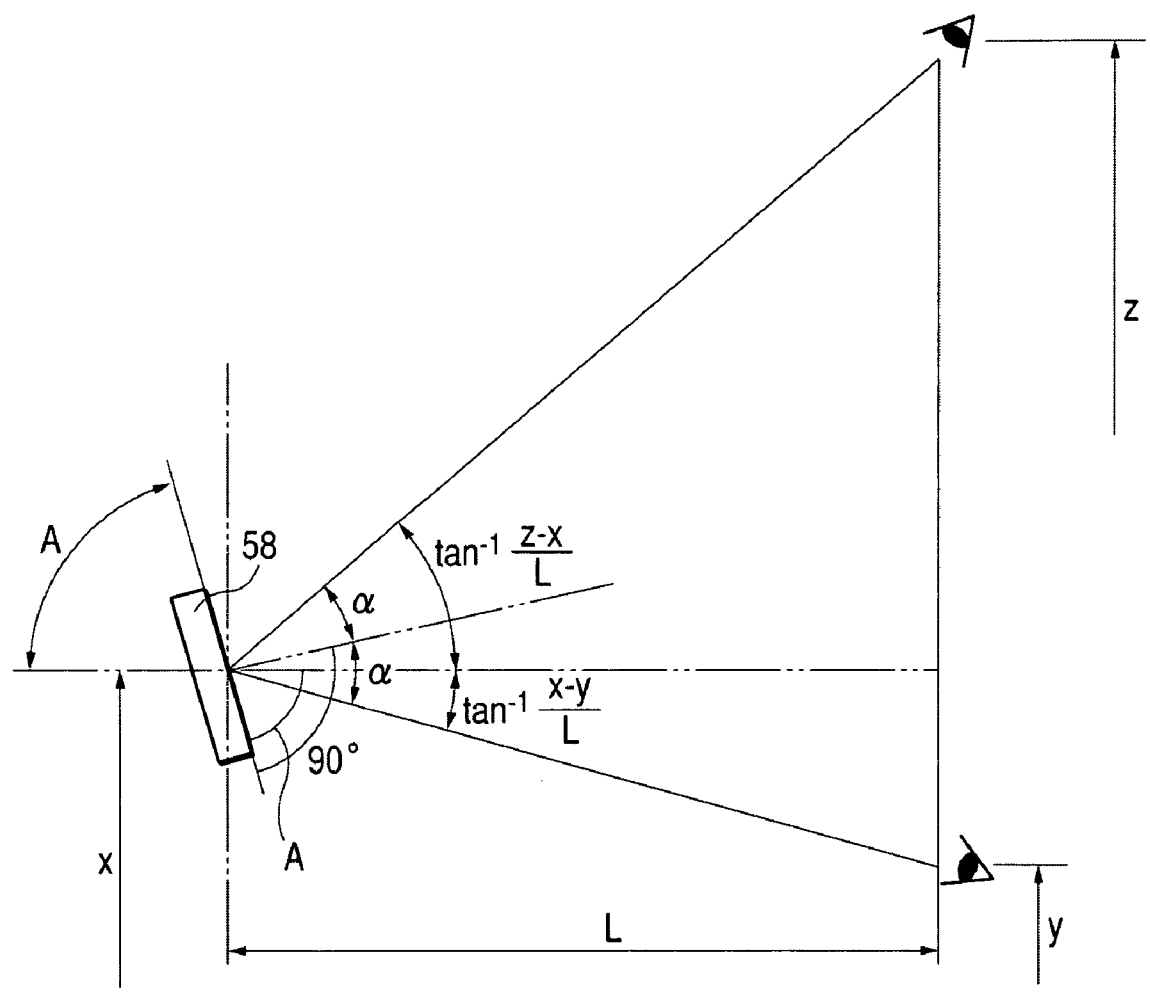
FIG. 6 is an illustrative view showing measurement of a standing angle of a display part of an image forming apparatus according to an embodiment of the invention.

FIG. 6 shows the relationship between the standing angle A of the display part 58 and the height (x) of the display part 58. Both the visibility for the seating position on a wheel chair (y) and the visibility for the standing position of the robust (x) can be simultaneously realized in the case where the standing angle A of the display part 58 satisfies the following expression (1).

$$90 + \alpha - \tan^{-1}\frac{z-x}{L} \geq A \geq 90 - \alpha + \tan^{-1}\frac{x-y}{L} \quad (1)$$

wherein A represents the standing angle (°) of the display part, α represents the angle (°) between the perpendicular line and the visibility limit, x represents the height of the display part, y represents the height of the visual point for the seating position, z represents the height of the visual point for the standing position, and L represents the horizontal distance between the display part and the visual point.

According to the calculation results of the expression (1), as shown in FIG. 7A, in the case where the viewing angle is 80° (i.e., the angle between the perpendicular line and the visibility limit α is 40°), the expression (1) is not approved for the height of the display part exceeding 1,115 mm, but as shown in FIG. 7B, in the case where the viewing angle is 120° (i.e., the angle between the perpendicular line and the visibility limit α is 60°), the expression (1) is approved for the height of the display part exceeding 1,205 mm.

According to the consideration, in this embodiment, the viewing angle of the display part 58 is set at 80°, and the standing angle thereof is set at about 50°, by way of example, whereby the display part can be viewed from the posture for the seating position on a wheel chair with the height of the display part up to 1,020 mm.

Figure 8A:
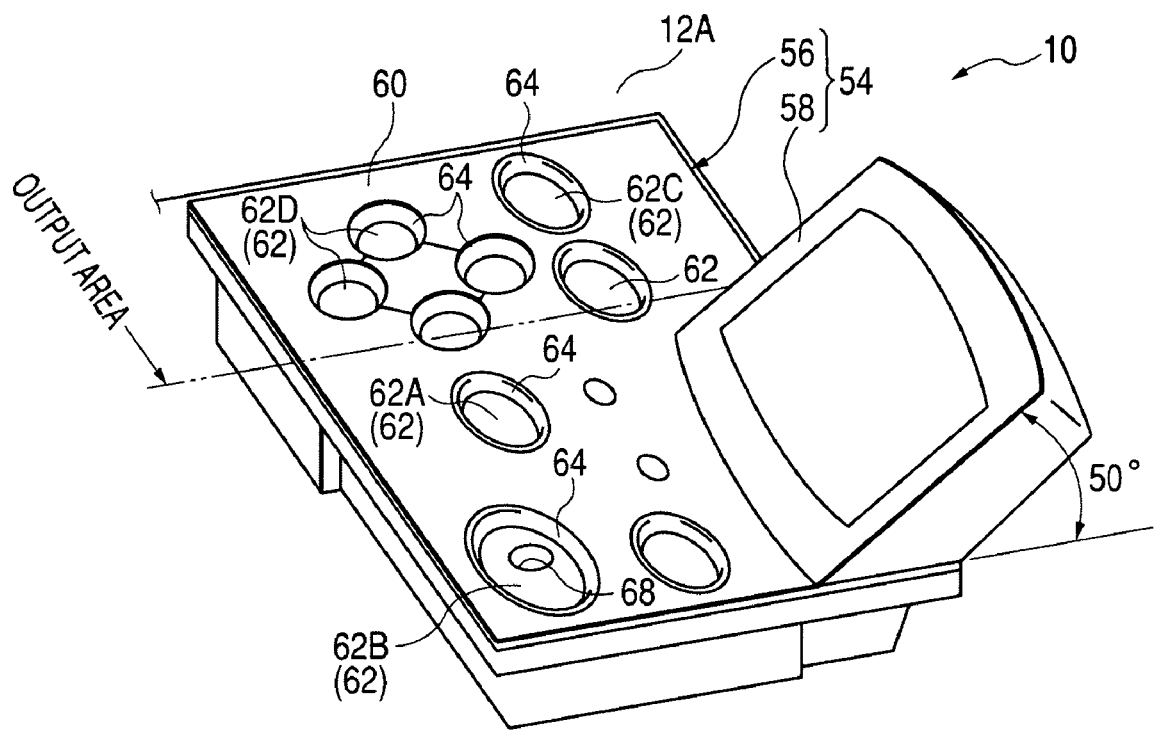
FIG. 8A is a perspective view showing an operation panel of an image forming apparatus according to an embodiment of the invention.
Figure 8B:
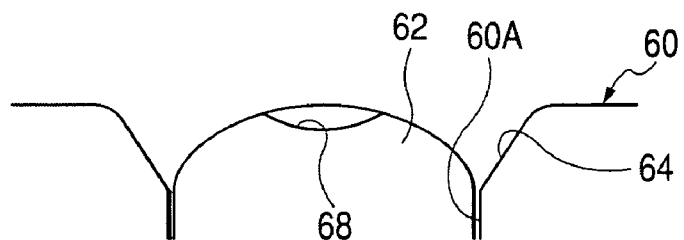
FIG. 8B is an illustrative view showing relationship between an operation button and a button cover.
Figure 9:
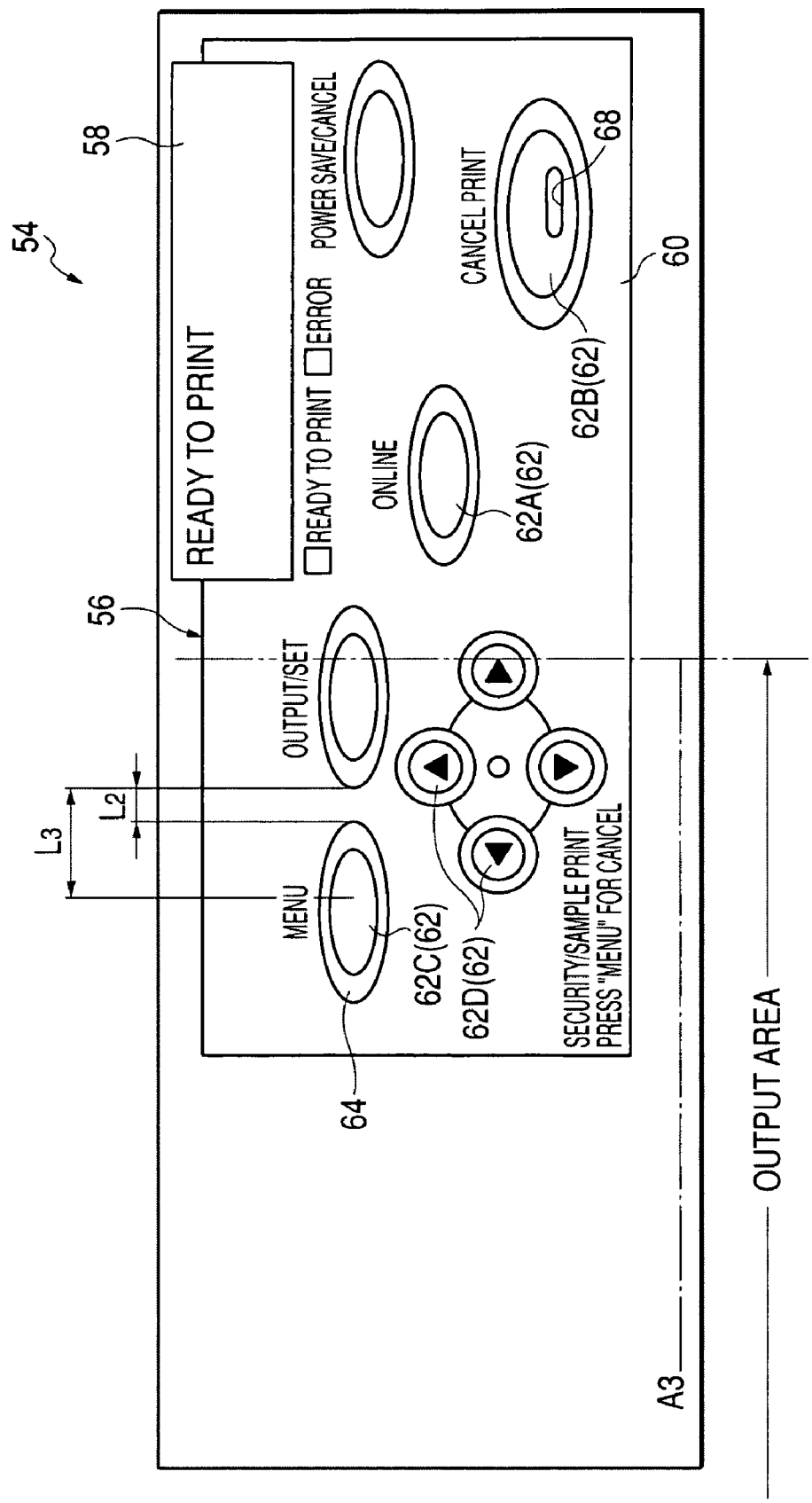
FIG. 9 is a plane view showing an operation panel of an image forming apparatus according to an embodiment of the invention.

As shown in FIGS. 8A, 8B and 9, a button cover 60 in a plate form is provided on an operation part 56 of the operation panel 54, and the button cover 60 is even to or lower than the upper surface 12A (the surface of the output area) of the image forming apparatus main member 12, so as to prevent from protruding from the upper surface 12A of the image forming apparatus main member 12. Furthermore, plural openings 60A are formed in the button cover 60, and operation buttons 62 for setting the operation mode are provided inside the openings 60A, respectively.

The button cover 60 and the image forming apparatus main member 12 are separately provided in this embodiment. However, the cover referred herein may not be necessarily separately provided, but it may be integrated in the image forming apparatus main member 12. In this case, even though the button cover 60 is not even to or lower than the upper surface 12A (the surface of the output area) of the image forming apparatus main member 12, the tip end of the sheet thus output is not caught thereby.

The operation buttons 62 are partially disposed inside the output area of the sheet thus output. For example, an online button (start button) 62A and a print cancel button 62B are not used before setting the operation mode of the image forming apparatus 10 but are such buttons 62 that are used during output of sheets, and thus problems occur when the online button 62A and the print cancel button 62B are hidden by the sheet thus output. Therefore, it is necessary that the online button 62A and the print cancel button 62B are disposed outside the output area.

On the other hand, a menu button 62C and select buttons 62D are such buttons 62 that are used upon setting the operation mode of the image forming apparatus 10, and thus there is no problem even when the menu button 62C and the select buttons 62D are hidden by the sheet thus output. Therefore, the operability of the image forming apparatus 10 is not impaired even in the case where the menu button 62C and the select buttons 62D are disposed inside the output area.

In other words, the plural operation buttons 62 constituting the operation part 56 are classified depending on the extent in frequency (or presence and absence) of use upon outputting sheets, and the operation buttons 62 of high frequency of use (i.e., the online button 62A and the print cancel button 62B herein) are disposed outside the output area of the sheet, whereas the operation buttons 62 of low frequency of use (i.e., the menu button 62C and the select buttons 62D herein) are disposed inside the output area.

Figure 10:
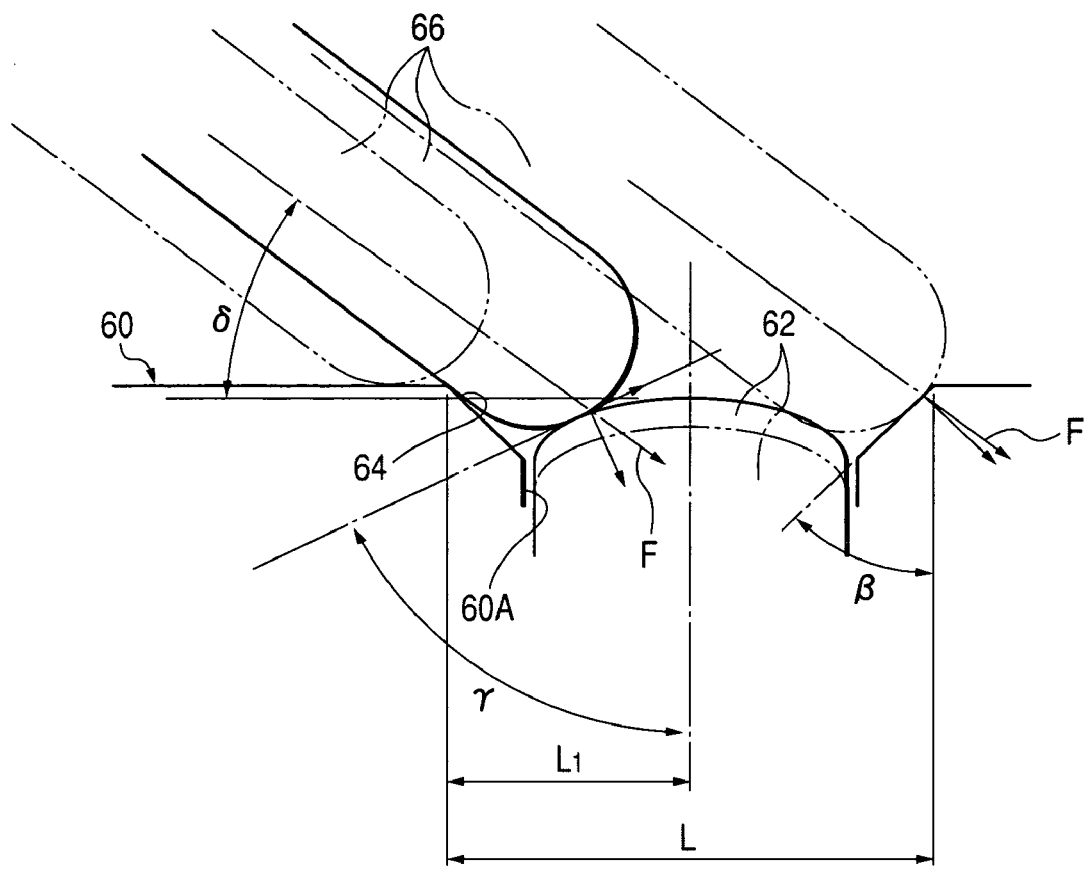
FIG. 10 is an illustrative view showing relationship between an operation button of an image forming apparatus according to an embodiment of the invention and a stick.
Figure 11:
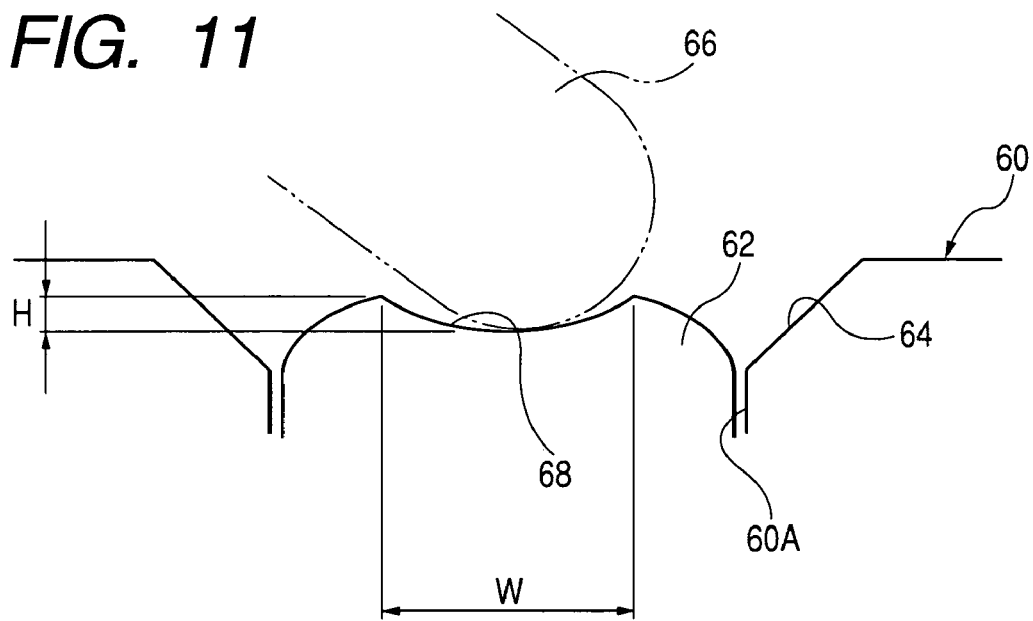
FIG. 11 is an illustrative view showing relationship between an operation button of an image forming apparatus according to an embodiment of the invention and a stick.
Figure 12:
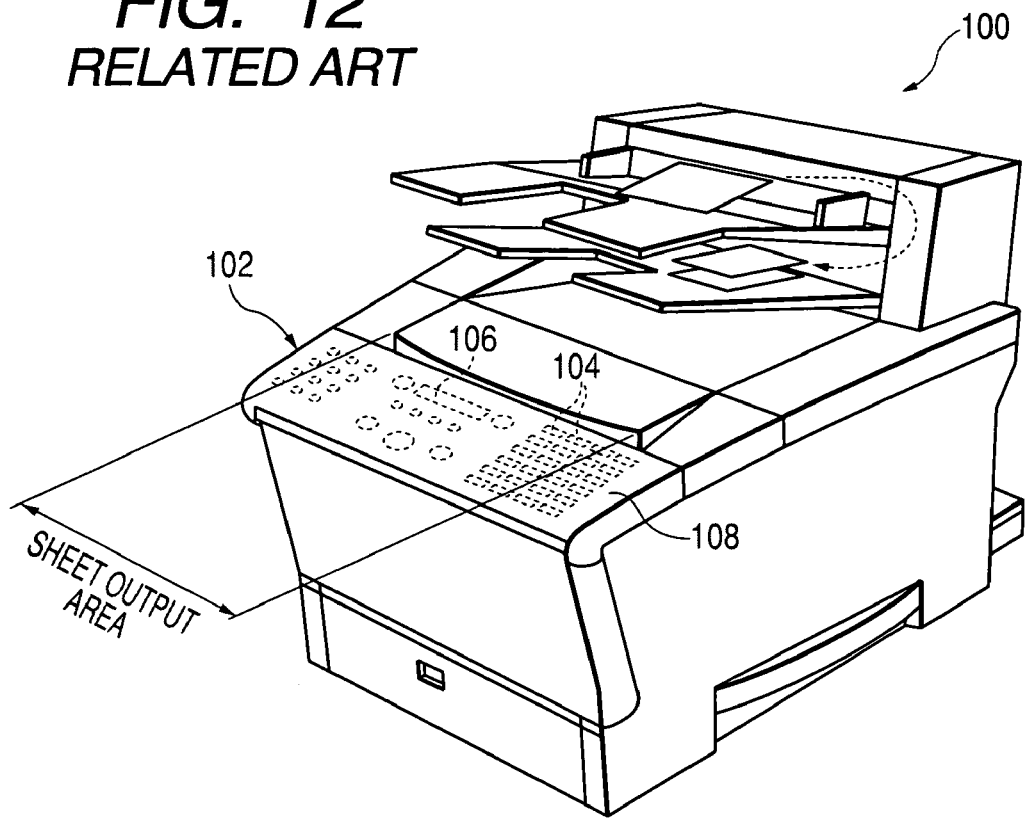
FIG. 12 is a perspective view showing an image forming apparatus according to a related art.
Figure 13:
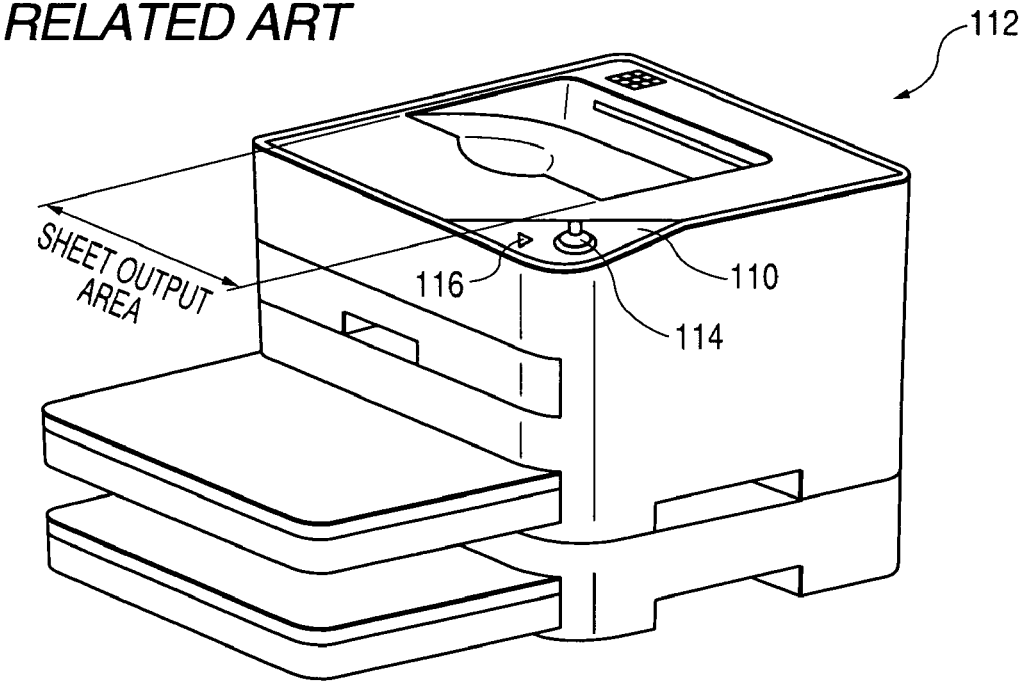
FIG. 13 is a perspective view showing an image forming apparatus according to another related art.

As shown in FIGS. 8B and 10, the operation button 62 is formed to have a substantial domed shape having a protruding central part, and the central part of the operation button 62 is even to or lower than the surface of the button cover 60, so as to prevent from protruding from the surface of the button cover 60. In the case where the depth of the operation button 62 is too large, the operation feeling upon pressing the operation button 62 with a finger is impaired by the surrounding button cover 60. Therefore, the depth of the central part of the operation button 62 is preferably set at about 0.5 mm under consideration of fluctuation in dimension.

A bank part 64 in a cone shape is formed on the opening 60A of the button cover 60 to receive a tip end of a stick 66 having a diameter of 3.5 mm (⅛ inch), such as a mouthstick and a headstick (which are bitten by or fixed on the head of a handicapped person with impaired arms to operate a keyboard or the like), by the gap between the bank part 64 and the outer periphery of the operation button 62.

The stick 66 can press the operation button 62 even in the case, for example, where the stick 66 is slanted with respect to the surface of the button cover 60 by 30°±5° (δ). Furthermore, the stick 66 can press the operation button 62 even in the case where the stick 66 bumped into the bank part 64 on the further side beyond the central part of the operation button 62.

The slant angle β of the bank part 64 and the static friction coefficient μ between the stick 66 and the bank part 64 preferably satisfy the following expression (2).

$$\beta < \tan^{-1} \mu + \delta \quad (2)$$

That is, assuming that the pressing force pressing the bank part 64 with the stick 66 is represented by F, the stick 66 does not slide on the bank part 64 in the case where the maximum frictional force along the bank part 64 (F cos(β−δ)·μ) is larger than the upward component force of the pressing force F along the bank part 64 (F sin (β−δ)). Therefore, the following expressions (3), (4), (5) and (2) are approved.

$$F \cos(\beta-\delta) \times \mu > F \sin(\beta-\delta) \quad (3)$$

$$\mu > \frac{\sin(\beta-\delta)}{\cos(\beta-\delta)} \quad (4)$$

$$\mu > \tan(\beta-\delta) \quad (5)$$

$$\beta < \tan^{-1} \mu + \delta \quad (2)$$

In the case where the slant angle β of the bank part 64 becomes small (i.e., the slant becomes steep), the concave formed by the bank part 64 becomes deep to increase the drop of the stick 66, whereby the operation feeling is impaired, and the impact received by the stick 66 upon bumping the stick 66 onto the bank part 64 is increased. Therefore, the slant angle β of the bank part 64 is preferably as large as possible (i.e., as gentle as possible) unless the stick 66 slides on the bank part 64.

In order to press the operation button 62 with the stick 66 without sliding on the outer periphery of the operation button 62, the tangent line angle γ of the operation button 62 at the contact point with the tip end of the stick 66 preferably satisfies the following expression (6) as similar to the case of the slant angle β of the bank part 64.

$$\gamma < \tan^{-1} \mu' + \delta \quad (6)$$

wherein μ' represents a static friction coefficient between the stick 66 and the operation button 62.

In order to press the operation button 62 with the stick 66 without sliding on the outer periphery of the operation button 62, a concave part 68 may be provided on the central part of the operation button 62, with which the tip end of the stick 66 can be engaged. According to the configuration, the operation button 62 can be pressed by hitching the tip end of the stick 66 to the concave part 68.

The width W of the concave part 68 is preferably 3.5 mm or more in order to hitch the tip end of the stick 66. Since the operation button 62 is lower than the surface of the button cover 60, there are some cases where the operation feeling upon pressing the operation button 62 with a finger is impaired by the bank part 64 of the button cover 60. Therefore, it is preferred that the maximum distance L between the bank parts 64 facing each other is 10 mm or more as shown in FIG. 10.

The maximum distance L may not be 10 mm or more in both the lengthwise and crosswise directions, but it may be 10 mm or more only in the crosswise direction as viewed from the front side of the image forming apparatus 10 as shown in FIG. 9. According to the configuration, the operation feeling of the operation button 62 that is substantially equivalent to a large size image forming apparatus 10 can be obtained in a small size image forming apparatus 10.

In order to receive the tip end of the stick 66 by the bank part 64 and the operation button 62, it is preferred that the distance $L_1$ from the boundary between the surface of the button cover 60 and the bank part 64 to the central part of the operation button 62 is 3.5 mm or more.

From the standpoint of prevention of operation mistakes upon pressing the operation buttons 62 (such as simultaneously pressing two operation buttons 62) by a physically handicapped person with impaired arms and legs, it is preferred, as shown in FIG. 9, that the distance $L_2$ between the boundaries between the surface of the button cover 60 and the bank part 64 is 6 mm or more, and the distance $L_3$ from the boundary between the surface of the button cover 60 and the bank part 64 to the center of the operation button 62 is 9 mm or more.

The function of the image forming apparatus according to the embodiment of the invention will be described.

As shown in FIGS. 8A and 9, the display part 58 is not hidden by the sheet thus output since the display part 58 is disposed outside the output area, whereby the visibility of the display part 58 can be ensured.

The display part 58 is provided as standing on the surface of the button cover 60, whereby the display part 58 can be viewed from the posture for the seating position on a wheel chair, as shown in FIGS. 4 and 5. In the case of a liquid crystal display having a viewing angle of 80° (an angle between the perpendicular line and the visibility limit of 40°), both the visibility for the seating position on a wheel chair and the visibility for the standing position of the robust can be simultaneously realized by providing the display part 58 as standing on the surface of the button cover 60 with a standing angle of about 50°. According to the configuration, so-called universal design for physically handicapped persons, aged persons and robust without discrimination can be realized.

Furthermore, as shown in FIGS. 1 and 9, a part of the operation part 56 is provided inside the output area, whereby the area of the operation part 56 can be enlarged. In other words, the area of the operation part 56 can be enlarged to space among operation buttons 62 even in a small size image forming apparatus.

Accordingly, operation mistakes, such as simultaneously pressing plural operation buttons 62, can be prevented even in the case where the operation part 56 is operated by a physically handicapped person with impaired arms and legs, and thus, miniaturization of the image forming apparatus 10 and improvement of the operability of the operation buttons 62 can be simultaneously realized.

More specifically, the operation buttons 62 are classified depending on the extent in frequency of use, and the operation buttons 62 of high frequency of use are disposed outside the sheet output area, whereas the operation buttons 62 of low frequency of use are disposed inside the sheet output area.

Even in the case where the operation buttons 62 of low frequency of use are hidden by the sheet thus output, the operability of the image forming apparatus 10 is not significantly impaired, and thus the area of the operation part 56 can be enlarged by disposing the operation buttons 62 of low frequency of use inside the output area.

As shown in FIGS. 8A and 8B, the upper surface of the operation button 62 is even to or lower than the surface of the button cover 60, so as to prevent from protruding from the surface of the button cover 60. Accordingly, even in the case where the operation button 62 is disposed inside the output area, the tip end of the sheet thus output is not caught by the operation button 62. Therefore, no protective member is necessary for preventing jam of sheets to reduce the cost.

Furthermore, in the case, for example, where the operation button 62 is operated with the stick 66, the tip end of the stick 66 is moved along the surface of the button cover 60. In the case where the operation button 62 even to or lower than the surface of the button cover 60 is operated with the stick 66, the operation is facilitated since the stick is not hindered by the operation button, in comparison to the case where an operation button protruding from the surface of the button cover is operated.

As shown in FIGS. 8A, 8B and 10, the bank part 64 in a cone shape is formed on the opening 60A of the button cover 60 to receive the tip end of the stick 66 by the gap between the bank part 64 and the outer periphery of the operation button 62, thus pressing the operation button 62. According to the configuration, the operation panel 54 according to the universal design can be produced.

In the case where the operation button 62 is formed to have a substantial domed shape having a protruding central part, and the bank part 64 in a cone shape is formed on the opening 60A of the button cover 60, whereby the tip end of the stick 66 can be smoothly moved to reduce an impact received by the stick 66.

The concave part 68 is provided on the central part of the operation button 62, with which the tip end of the stick 66 can be engaged, whereby the operation button 62 can be pressed by hitching the tip end of the stick 66 to the concave part 68 even in the case where the outer diameter of the stick is larger than 3.5 mm or the case where the angle δ formed between the stick 66 and the surface of the button cover 60 is larger than 30°±5°.

The pressing operation of the operation button 62 with the stick 66 can be attained in various manners as having been described, whereby the operability of the operation panel 54 can be further enhanced.

The standing angle of the display part 58 with respect to the surface of the button cover 60 is about 50° herein, but it is a mere example. The standing angle of the display part 58 also varies depending on the viewing angle of the display part 58, and it is sufficient when both the visibility for the seating position on a wheel chair and the visibility for the standing position of the robust can be simultaneously realized. Therefore, the standing angle of the display part 58 is not limited to the value employed herein.

It is also possible that the display part 58 is disposed movably with respect to an axis, which is not shown in the figures, and the standing angle of the display part 58 is changed with an angular variable device, with which the display part 58 is fixed at a prescribed angle through frictional resistance to the axis. In this case, it is convenient since the standing angle can be freely set, but the standing angle of the display part 58 is preferably fixed from the standpoint of the cost of the image forming apparatus 10 and the reliability of the angular variable device.

The angle δ between the stick 66 and the surface of the button cover 60 is assumed to be 30°±5° herein, but it is a mere example and is not limited to the value employed herein.

The materials for the operation button 62 and the bank part 64 may be constituted by plastics. In this case, the static friction coefficient μ of the operation button 62 and the static friction coefficient μ' of the bank part 64 can be substantially equal to each other, and thus, the angle β and the angle γ (see FIG. 10) can be set at angles substantially equal to each other. The angle γ can be made larger than the angle β by constituting the operation button 62 by a material having a high friction coefficient, such as rubber.

Although the image forming apparatus 10 has been described herein, the particular effect of the invention can be obtained-solely by the operation panel 54 upon operating the operation button 62 with the stick 66, and therefore, the invention can be applied not only to the operation panel 54 of the image forming apparatus 10 but also to a keyboard and an operation button for electric appliances, such as an electronic calculator.

According to the invention having the aforementioned constitution, the visibility of the display part can be ensured. Furthermore, the area of the operation part can be enlarged in a small size image forming apparatus to space among operation buttons on the operation part. According to the constitution, operation mistakes, such as pressing plural buttons simultaneously, can be avoided even in the case where a physically handicapped person with impaired arms and legs operates the operation part, whereby miniaturization of the image forming apparatus and improvement of the operability of the operation part can be simultaneously realized.

The entire disclosure of Japanese Patent Application No. 2003-131990 filed on May 9, 2003 including specification, claims, drawings and abstract is incorporated herein by reference in its entirety.

What is claimed is:

1. An image forming apparatus comprising:
an image forming unit that forms an image on a sheet;
a sheet output part that outputs the sheet having the image formed thereon by the image forming unit; and
an operation panel for controlling the image forming unit, disposed in a vicinity of the sheet output part, the operation panel comprising an operation part for setting an operation mode and a display part that displays the operation mode, at least a part of the operation part being disposed inside a sheet output area of the sheet output part, and the display part being disposed outside the sheet output area,
wherein the sheet output area is defined as the portion of an upper surface of the image forming apparatus onto which sheets are output after images are formed.

2. The image forming apparatus as claimed in claim 1, wherein the operation part comprises a plurality of pressable operation buttons and a cover having openings, within which the plurality of operation buttons are disposed, and upper surfaces of the plurality of operation buttons disposed in the sheet output area are even to or lower in height than a surface of the cover.

3. The image forming apparatus as claimed in claim 2, wherein some of the plurality of operation buttons that are used infrequently are disposed inside the sheet output area.

4. The image forming apparatus as claimed in claim 2, wherein the display part stands on the surface of the cover.

5. The image forming apparatus as claimed in claim 4, further comprising an angular varying part that varies a standing angle of the display part with respect to the cover.

6. The image forming apparatus as claimed in claim 4, wherein the standing angle A (°) of the display part satisfies the following expression (1):

$$90 + \alpha - \tan^{-1}\frac{z-x}{L} \geq A \geq 90 - \alpha + \tan^{-1}\frac{x-y}{L} \qquad (1)$$

wherein x represents a height (mm) of the display part from a floor surface, y represents a height (mm) of a visual point for a seating position on a wheel chair from a floor surface, z represents a height (mm) of a visual point for a standing position from a floor surface, L represents a horizontal distance (mm) between the display part and the visual point, and α represents an angle (°) between a line perpendicular to the display part and a visibility limit.

7. The image forming apparatus as claimed in claim 2, wherein any of the plurality of operation buttons is formed to have a substantial domed shape having a protruding central part, the central part of the operation button is even to or lower in height than the surface of the cover, and a bank part in a cone shape toward a periphery of the operation button is formed on a periphery of the opening of the cover.

8. The image forming apparatus as claimed in claim 7, wherein a concave part is provided on a central part of the operation button, with which a tip end of a mouthstick or a headstick is engaged.

* * * * *